US006457700B1

(12) United States Patent
Hong

(10) Patent No.: US 6,457,700 B1
(45) Date of Patent: Oct. 1, 2002

(54) LIFT DEVICE

(76) Inventor: Wen-Cheng Hong, 58, Ma Yuan West St., Taichung (TW)

(*) Notice: Subject to any disclaimer, the term of this patent is extended or adjusted under 35 U.S.C. 154(b) by 5 days.

(21) Appl. No.: 09/811,262

(22) Filed: Mar. 15, 2001

(51) Int. Cl.$^7$ .................................................. B60P 1/48

(52) U.S. Cl. ........................ 254/8 B; 254/124; 254/134

(58) Field of Search ................................ 254/8 B, 124, 254/133 R, 134, DIG. 16; 269/17

(56) References Cited

U.S. PATENT DOCUMENTS 4,497,469 A * 2/1985 Barnhouse .................. 254/8 B 6,089,545 A * 7/2000 Norman et al. ............. 254/134

6,276,665 B1 * 8/2001 Hawkins et al. ............ 254/8 B

* cited by examiner

*Primary Examiner*—Robert C. Watson

(57) ABSTRACT

A lift device has a generally A-shaped base frame, a leg frame connected to the generally A-shaped base frame, a support post disposed on the leg frame, and a cantilever frame disposed on the support post. The cantilever frame has a pair of parallel upper links and a pair of parallel lower links. A jack is disposed on the generally A-shaped base frame and disposed between the parallel lower links. An L-shaped outer frame is disposed between the parallel upper links and disposed between the parallel lower links. An inner frame is inserted in the L-shaped outer frame. A collar encloses the L-shaped outer frame. An end hook is disposed on an end of the inner frame.

2 Claims, 6 Drawing Sheets

LIFT DEVICE

BACKGROUND OF THE INVENTION

The present invention relates to a lift device. More particularly, the present invention relates to a lift device which can be adjusted.

A conventional lift device cannot be adjusted to lift various types of engines of vehicles.

SUMMARY OF THE INVENTION

An object of the present invention is to provide a lift device which can be adjusted.

Accordingly, a lift device comprises a generally A-shaped base frame, a leg frame connected to the generally A-shaped base frame, a support post disposed on the leg frame, and a cantilever frame disposed on the support post. The generally A-shaped base frame has two front casters. The leg frame has two rear casters. The cantilever frame has a pair of parallel upper links and a pair of parallel lower links. A jack is disposed on the generally A-shaped base frame and disposed between the parallel lower links. An L-shaped outer frame is disposed between the parallel upper links and disposed between the parallel lower links. An inner frame is inserted in the L-shaped outer frame. A pin fastens the L-shaped outer frame and the inner frame together. A collar encloses the L-shaped outer frame. A column is disposed on the collar. An adjusting bolt fastens the collar and the L-shaped outer frame together. An end hook is disposed on an end of the inner frame.

DETAILED DESCRIPTION OF THE INVENTION

Figure 1:
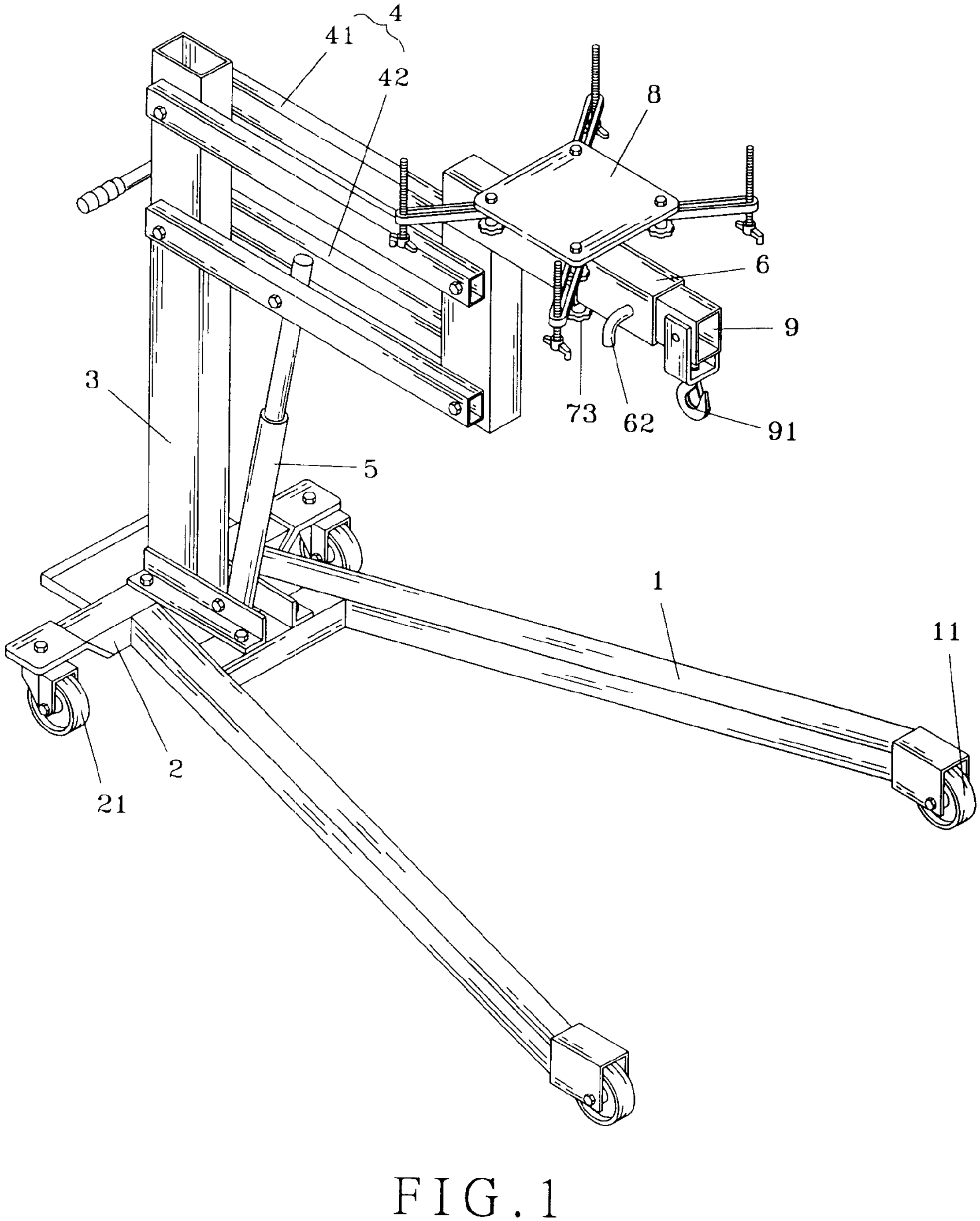
FIG. 1 is a perspective view of a lift device of a preferred embodiment with a disk.
Figure 2:
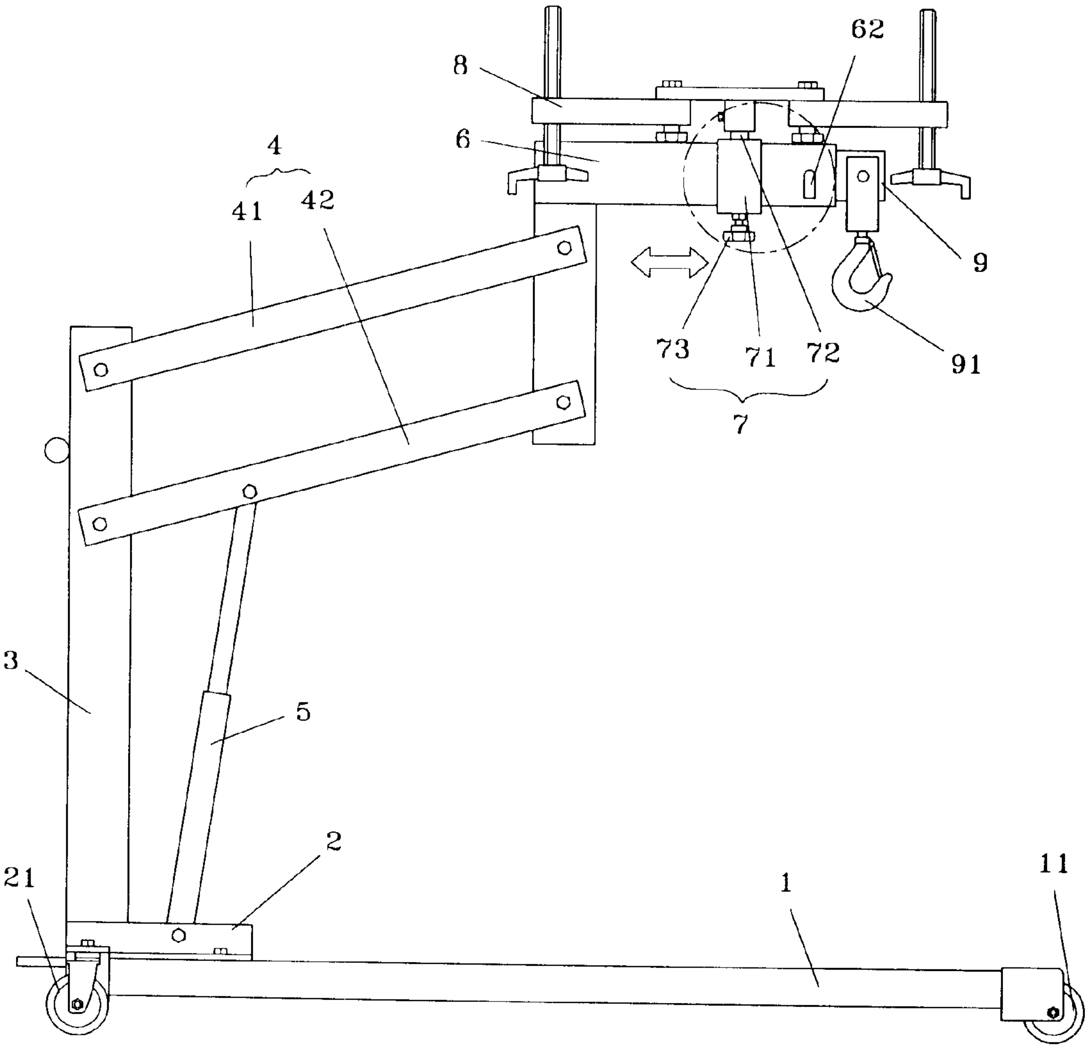
FIG. 2 is an elevational view of FIG. 1.
Figure 3:
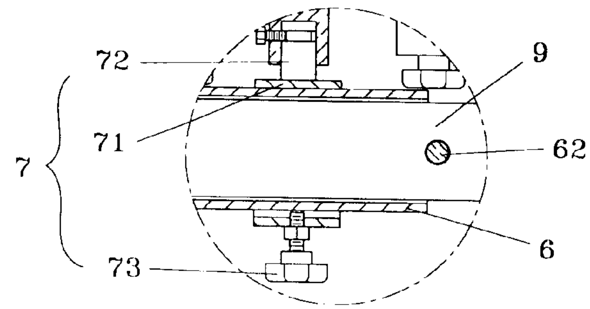
FIG. 3 is a partially sectional view of FIG. 2.
Figure 4:
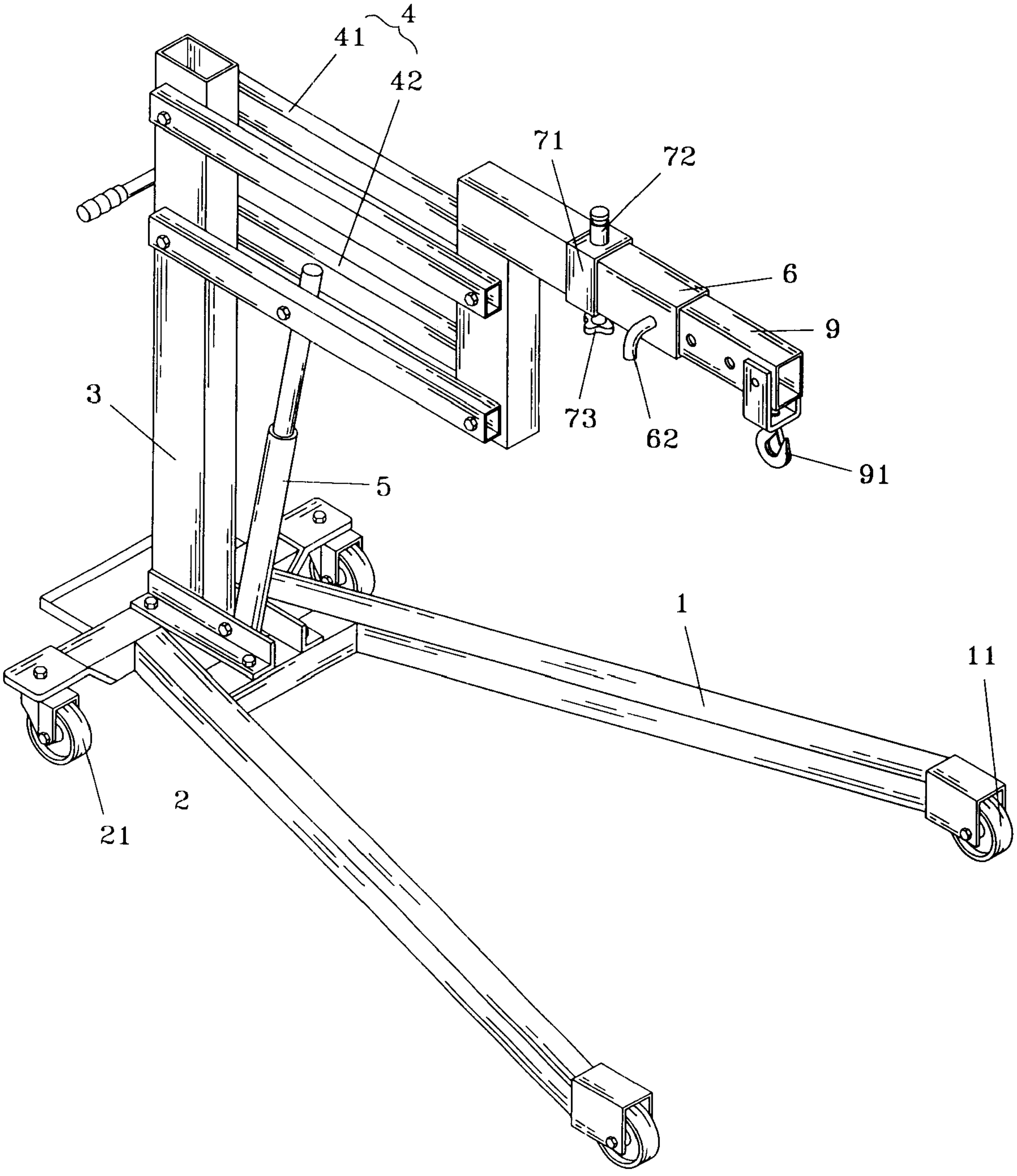
FIG. 4 is a perspective view of a lift device of a preferred embodiment without a disk.
Figure 5:
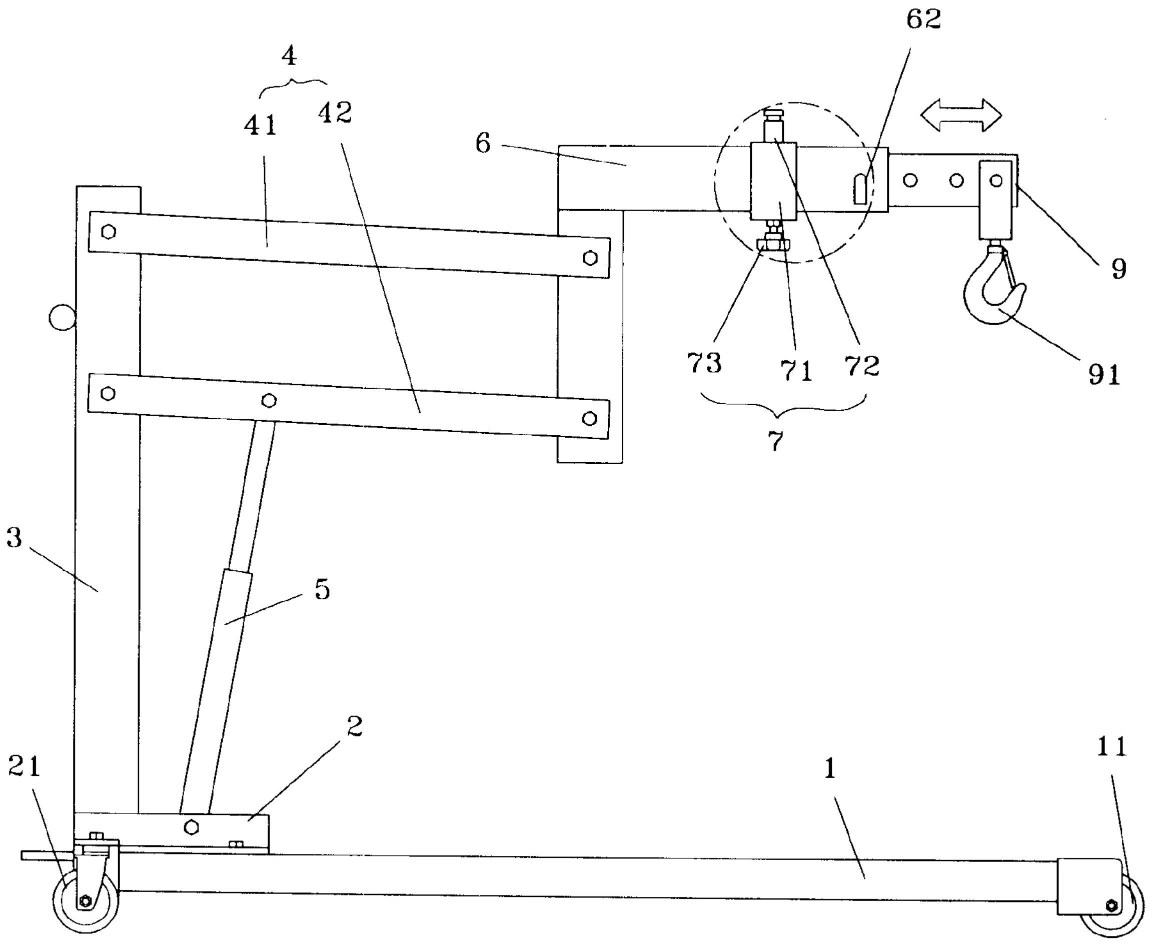
FIG. 5 is an elevational view of FIG. 4.
Figure 6:
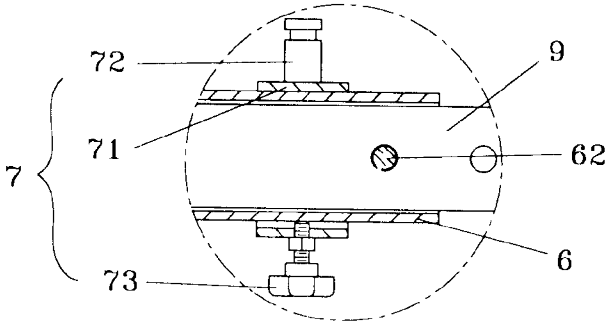
FIG. 6 is a partially sectional view of FIG. 5.

Referring to FIGS. 1 to 6, a lift device comprises a generally A-shaped base frame 1, a leg frame 2 connected to the generally A-shaped base frame 1, a support post 3 disposed on the leg frame 2, and a cantilever frame 4 disposed on the support post 3.

The generally A-shaped base frame 1 has two front casters 11.

The leg frame 2 has two rear casters 21.

The cantilever frame 4 has a pair of parallel upper links 41 and a pair of parallel lower links 42.

A jack 5 is disposed on the generally A-shaped base frame 1 and disposed between the parallel lower links 42.

An L-shaped outer frame 6 is disposed between the parallel upper links 41 and disposed between the parallel lower links 42.

An inner frame 9 is inserted in the L-shaped outer frame 6.

A pin 62 fastens the L-shaped outer frame 6 and the inner frame 9 together.

A collar 71 encloses the L-shaped outer frame 6.

A column 72 is disposed on the collar 71.

An adjusting bolt 73 fastens the collar 71 and the L-shaped outer frame 6 together.

An end hook 91 is disposed on an end of the inner frame 9.

A disk 8 is disposed on the column 72.

Referring to FIG. 1 again, the adjusting bolt 73 is loosened so that the collar 71 can be moved.

Figure 7:
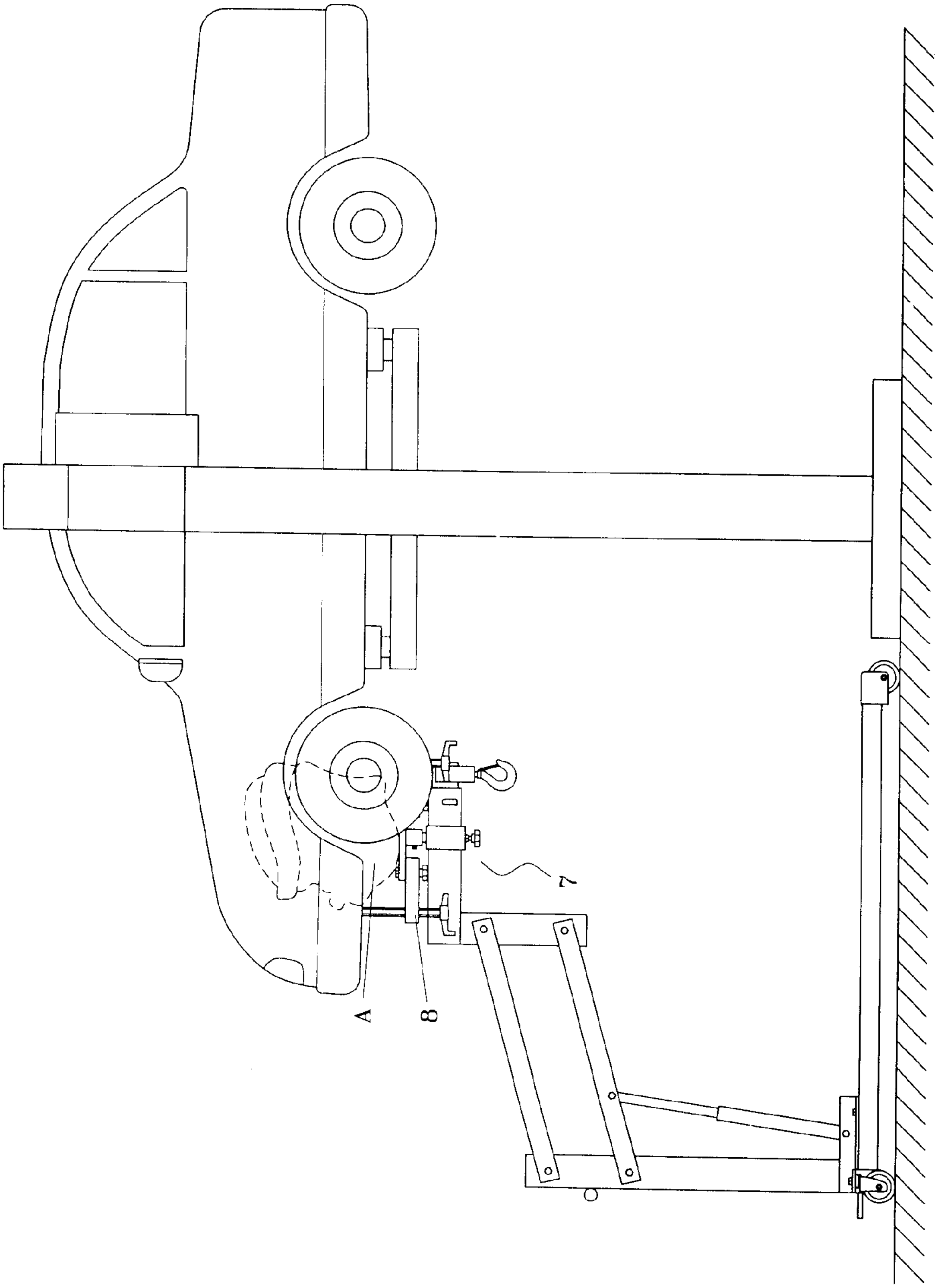
FIG. 7 is a schematic view illustrating an operation of a lift device of a preferred embodiment with a disk.

Referring to FIG. 7, the disk 8 supports an engine A.

Figure 8:
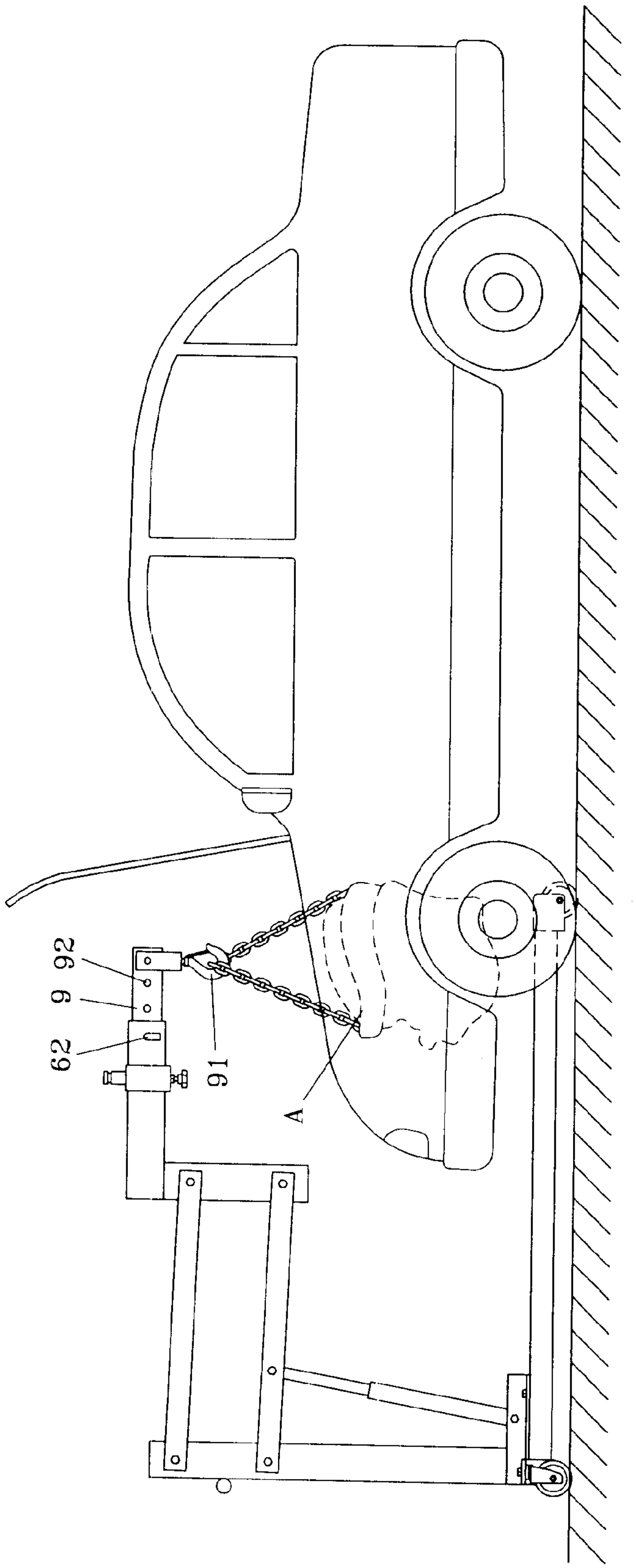
FIG. 8 is a schematic view illustrating an operation of a lift device of a preferred embodiment without a disk.

Referring to FIG. 8, the end hook 91 lifts the engine A.

The present invention is not limited to the above embodiment but various modification thereof may be made. Furthermore, various changes in form and detail may be made without departing from the scope of the present invention.

I claim:

1. A lift device comprises:

- a generally A-shaped base frame,
- a leg frame connected to the generally A-shaped base frame,
- a support post disposed on the leg frame,
- a cantilever frame disposed on the support post,
- the generally A-shaped base frame having two front casters,
- the leg frame having two rear casters,
- the cantilever frame having a pair of parallel upper links and a pair of parallel lower links,
- a jack disposed on the generally A-shaped base frame and disposed between the parallel lower links,
- an L-shaped outer frame disposed between the parallel upper links and disposed between the parallel lower links,
- an inner frame inserted in the L-shaped outer frame,
- a pin fastening the L-shaped outer frame and the inner frame together,
- a collar enclosing the L-shaped outer frame,
- a column disposed on the collar,
- an adjusting bolt fastening the collar and the L-shaped outer frame together, and
- an end hook disposed on an end of the inner frame.

2. The lift device as claimed in claim 1, wherein a disk is disposed on the column.

* * * * *